US008965879B2

(12) United States Patent
Johri et al.

(10) Patent No.: US 8,965,879 B2
(45) Date of Patent: Feb. 24, 2015

(54) UNIQUE JOIN DATA CACHING METHOD

(75) Inventors: Vijeta Johri, Bellevue, WA (US); Zhonghua Chu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 412 days.

(21) Appl. No.: 13/152,748

(22) Filed: Jun. 3, 2011

(65) Prior Publication Data

US 2012/0310918 A1 Dec. 6, 2012

(51) Int. Cl.
*G06F 17/30* (2006.01)

(52) U.S. Cl.
CPC .... *G06F 17/30457* (2013.01); *G06F 17/30498* (2013.01)
USPC .......................................... 707/714

(58) Field of Classification Search
USPC .......................................... 707/714
See application file for complete search history.

(56) References Cited

U.S. PATENT DOCUMENTS

| 6,341,281 | B1 | 1/2002 | MacNicol | |
|---|---|---|---|---|
| 7,467,131 | B1 | 12/2008 | Gharachorloo | |
| 7,634,465 | B2 | 12/2009 | Sareen | |
| 7,818,349 | B2 | 10/2010 | Frost | |
| 2004/0111486 | A1* | 6/2004 | Schuh et al. | 709/214 |
| 2005/0240570 | A1 | 10/2005 | Ozbutun | |
| 2006/0195460 | A1* | 8/2006 | Nori et al. | 707/100 |
| 2008/0098041 | A1 | 4/2008 | Chidambaran | |
| 2008/0235280 | A1* | 9/2008 | Schoen et al. | 707/104.1 |
| 2009/0043736 | A1* | 2/2009 | Han et al. | 707/3 |
| 2009/0100002 | A1 | 4/2009 | Nolan | |
| 2011/0258178 | A1* | 10/2011 | Eidson et al. | 707/714 |
| 2012/0197868 | A1* | 8/2012 | Fauser et al. | 707/714 |

OTHER PUBLICATIONS

"Derby's Cost Based Optimization" (http://db.apache.org/derby/manuals/tuning/perf45.html): Apr. 29, 2006.
"SQL Alchemy 0.6.6 Documentation" (http://www.sqlalchemy.org/docs/orm/inheritance.html): Jan. 7, 2011.

* cited by examiner

*Primary Examiner* — Syling Yen
*Assistant Examiner* — Navneet K Ahluwalia
(74) *Attorney, Agent, or Firm* — Damon Rieth; Jim Ross; Micky Minhas (57) ABSTRACT

Enterprise systems, methods and computer program products are disclosed for providing caching of data retrieved from joined tables and an inheritance table hierarchy of a database in an enterprise. The computer implemented method comprises creating a queue of cursors of a statement associated with a database; evaluating a cursor of the queue and marking as one of a unique record and an object of an inheritance table; and, if a cursor of the queue is marked as one of a unique record and a unique object, then, storing data associated with one of the unique record and object in a data cache for subsequent retrieval, thus avoiding costly network calls. If the process leaves a cursor unevaluated, the method retrieves data from an enterprise database associated with the statement. The process is implemented on an application object server including a data access layer and a kernel instance.

20 Claims, 7 Drawing Sheets

UNIQUE JOIN DATA CACHING METHOD

FIELD OF THE INVENTION

The present invention generally relates to enterprise computer systems and methods and more particularly to systems, methods and computer program products for facilitating unique join data caching in an enterprise resource planning system operating on a specially programmed computer server.

BACKGROUND

In today's technological environment, it is common for enterprises such as business organizations, schools, charitable organizations and government organizations to deploy private computer networks—intranets—to securely share such organization's information or network operating system within that organization. The term "intranet" is used in contrast to "internet", which is a network between and among individuals and organizations, the most common of which is the global, public Internet. That is, an intranet is a network within an enterprise which sometimes refers only to an internal (private) website, but may be a more extensive part of the enterprise's information technology (IT) infrastructure. For example, in many enterprises, an employee may work from home and gain access to the enterprise via a portal requiring additional security hurdles such as synchronous keys for entry. An enterprise intranet may host multiple private websites and constitute an important component and focal point of internal communication with, and collaboration among, individual computer users associated/affiliated with the enterprise (e.g., students within a university, co-workers within a company, members of a governmental department or the like).

As individual computer users associated/affiliated with the enterprise perform various computer-based activities while logged into the intranet, these users may utilize enterprise resource planning (ERP) client/server systems as provided by the enterprise. One such system known as the Dynamics® AX 2009 ERP system available from Microsoft Corporation of Redmond, Wash. provides a database query server and associated application object server among other features. These are routinely accessed by a client, for example, to query the database for data contained in tables. The database may comprise a plurality of related tables of data, for example, related to everyday activities of the enterprise. A member of the enterprise may perform a query of the database known as a join query in which, for example, in the sequential query language (SQL), a join query relates to a query in which two (or more) tables of data of a database are temporarily joined in order to select data of the tables without impacting the data in the tables. To perform a join query, information in the query may comprise at least one table, a column or row and a condition to make the join temporarily occur.

In known enterprise systems, a join query may be processed at the database each time the join is executed. This can cause degradation in performance of the ERP system as a whole. Even if the same query is run several times, the same query may be executed on the database each time the query is run. In the case of a typical enterprise structure involving a client (making a query), a server and a database, making the same query may lead to expensive network calls, time and resource consumption impacting the ERP system as a whole.

In at least one enterprise resource planning system, data caching is performed for a unique single table select query, meaning when there is no join condition or table inheritance to connect a first database table to another. There exists a unique index of a table of the database. However, the query is not a join query neither is there a join condition or inheritance connection to another table. Referring to FIGS. 2A, 2B, 4 and 5, there is shown a process of data caching at a level of a data record of a table having a unique index of a database which may be referred to herein as record level caching. Similar reference characters are used to denote similar elements in similar drawings. Also, the first numeral of a reference may indicate the figure number where that element first appears.

Figure 2A:
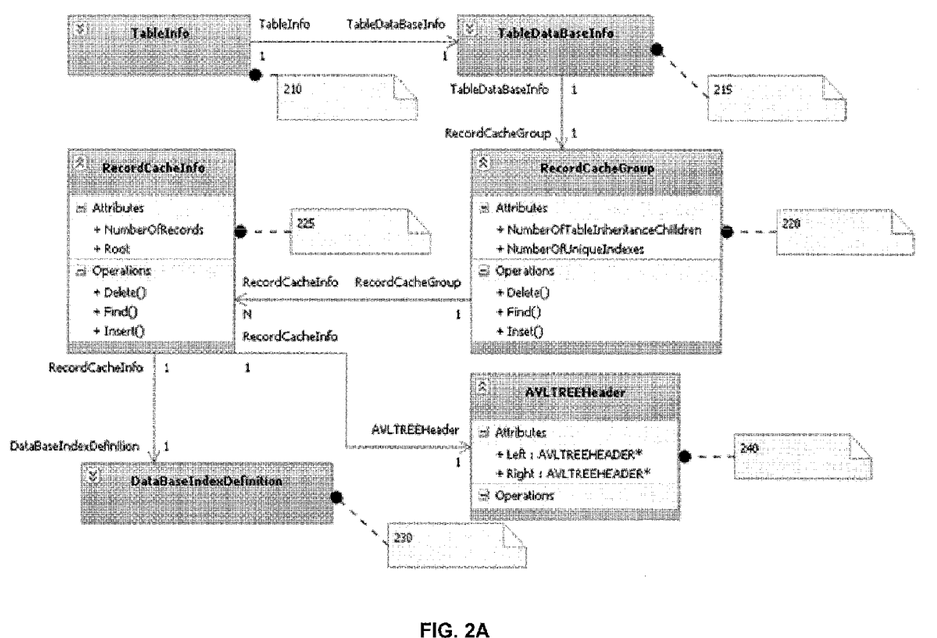
FIG. 2A provides an overall structure of a plurality of data structures useful for record level caching.
Figure 2B:
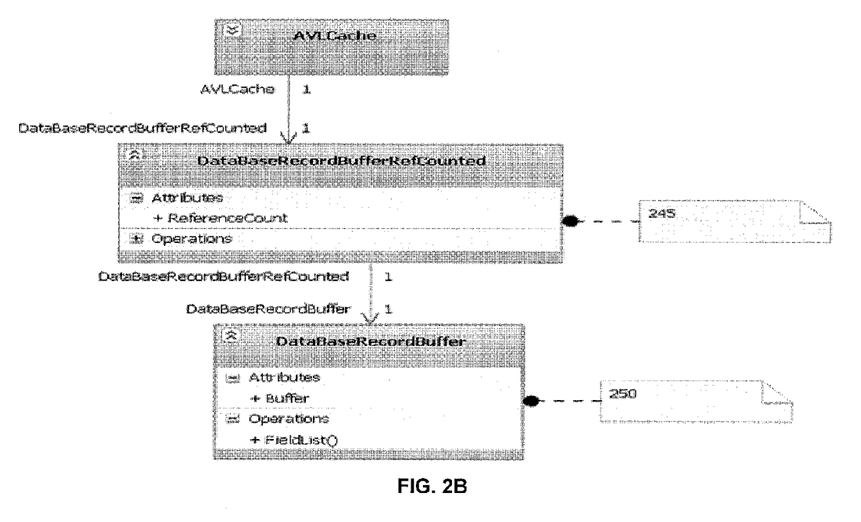
FIG. 2B provides data structures for storing data in a record level caching process.

Unique keys may be declared using unique indexes. A SELECT statement may select a record from a table using an equal operator, for example, in one language, denoted == on the caching key. Referring to FIGS. 2A and 2B, there are shown a plurality of exemplary data structures involved in record level caching. The names of the data structures are exemplary names and not intended to be limiting. Beginning at the left of FIG. 2A, TableInfo 210 contains a reference to TableDataBaseInfo 215 which refers to RecordCacheGroup 220. RecordCacheGroup 220 in turn refers to one RecordCacheInfo 225 per the unique index for the desired table. RecordCacheInfo corresponds to one unique index definition, for example, DataBaseIndexDefinition. A root of the RecordCacheInfo 225 may be represented as header AVLTree 240. Referring to FIG. 2B, AVLCache may refer to DataBaseRecordBufferRefCounted 245 which maintains a reference to DataBaseRecordBuffer 250.

Figure 1:
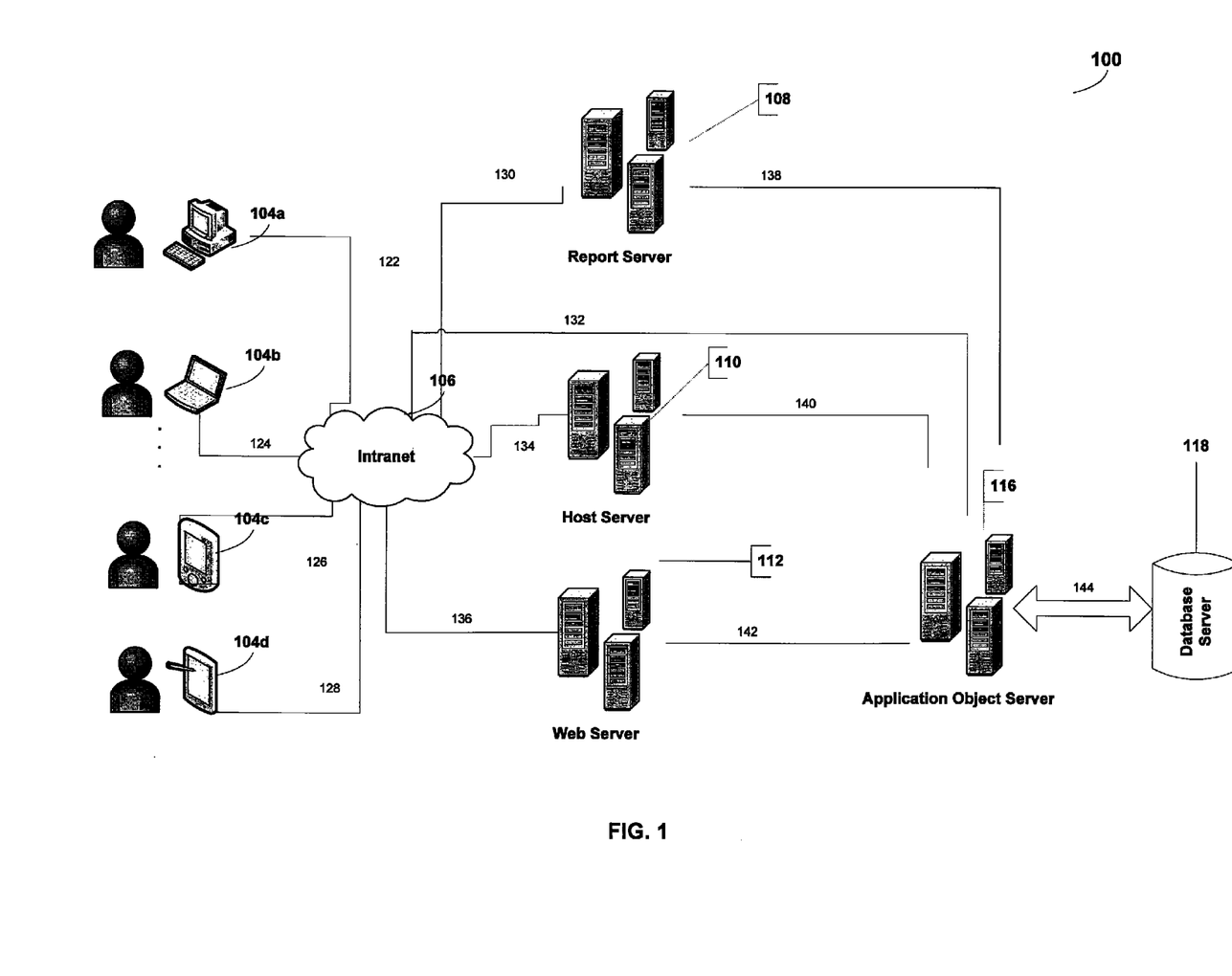
FIG. 1 is a block diagram illustrating an exemplary intranet client server enterprise system according to an embodiment of the present invention wherein client devices may gain access to an application object server directly or via a report server, a host server or a web server; the application object server, in turn may access a database server.
Figure 4:
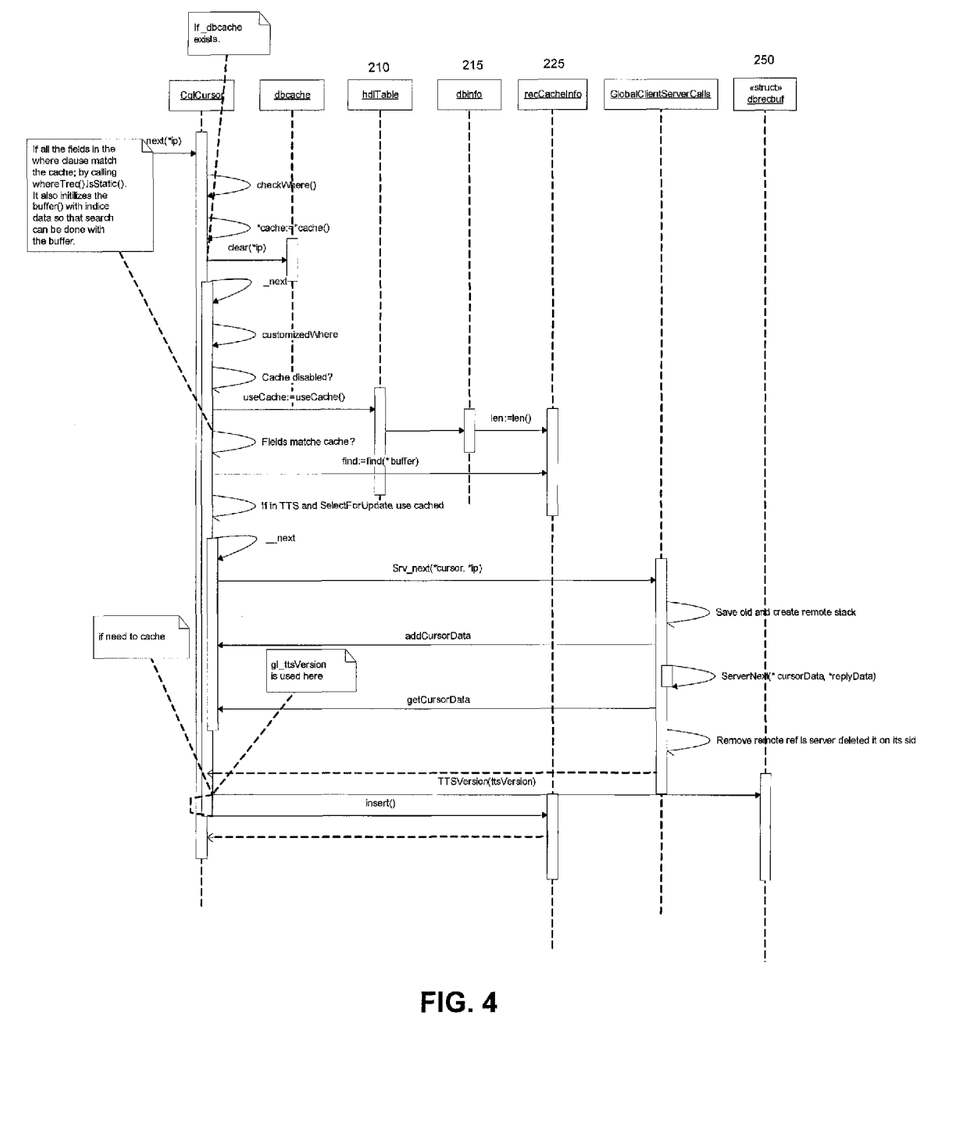
FIG. 4 shows details of a process for a record level caching, for example, of a unique table index without any join or inheritance table support.

In this process, data structure DataBaseRecordStructure 250 may be a data structure that may comprise the actual data. The data may be stored in a byte array of dataRow. DataRow is used by way of example and may comprise a data column in an alternative embodiment. The data represented by an instance of DataBaseRecordBuffer 250 correlates to a row of data in the database table, for example, a table of a database of database server 118 (FIG. 1). RecordCacheInfo 225 may be an associative container of DataBaseRecordBuffer 250. The RecordCacheInfo structure 225 may be an associative container of DataBaseRecordBuffer 250. The RecordCacheInfo structure may represent a unique index in the database. An associative container may be built on an AVL tree 240 (a self-balancing binary search tree named for Adeison-Velski/Landis). FIG. 4 represents record level caching in action according to one process of unique table caching and will not be described in detail herein.

Data retrieval from record level caching is exemplified by FIG. 2B. A where clause in the database query may match any of the unique indexes on the table. The data row in a record level cache, for example, may be represented internally in the kernel 625 (FIG. 6) of an application object server 116, 600 using DataBaseRecordBuffer 250. In a record level cache, DatabaseRecordBuffer 250 may be stored as a node in an AVL tree 240. Each node of an AVL tree 240 may be represented using AVLTREEHeader structure 240 (FIG. 2A). Since there may exist a collection of unique indexes, the kernel 625 may use a reference counting scheme instead of making copies of a data buffer for each index to keep track of the DataBaseRecordBuffer 250 structures that are stored in the AVLTREEHeader 240. For example, the DataBaseRecordBufferRefCounted 245 structure may be a wrapper for DatabaseRecordBuffer 245 with a reference count. If the record is not found in the cache, then the record may be fetched from the database and inserted into each of the trees corresponding to unique indexes.

Fundamentally, there is a need in the art for a caching of join queries to avoid the degradation in performance so that the caching may result in more efficient ERP system operation. Moreover, a problem may arise during normalization of an enterprise resource planning system when a number of single table select queries may be replaced by join queries. Also, table inheritance, when one table may be the parent of another table and so on, may cause repetitive queries of the same tables and the same join query processes may need to be performed.

Thus, it may be known to provide a unique single table select query, however, what are needed are systems, methods and computer program products for adapting existing processes for unique single table select caching to expand caching to, for example, unique join and table inheritance object queries.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by setting up and providing run-time systems, methods and computer program products for adapting existing processes for unique single table select caching to expand caching to, for example, unique join and table inheritance queries.

In an embodiment, an application object server comprises a kernel associated with a query framework and a query generation model which, in turn may utilize sequential query language (SQL) for access to a data access layer and so to a record ID generator. In a method of unique join data caching, a preliminary process comprises determining whether a given query is eligible for caching. Of course, unique table caching proceeds as described above and join support involves determining whether a statement has an explicit predicate match to a unique index for a table, for example, using the == operator. Using this table as a starting point, there may be join conditions associated with this table or, in other words, a predicate with a query valid for join caching. A combination of the where predicate and join condition then may satisfy the caching requirement for other tables in the statement.

In a related embodiment, table inheritance data caching may relate to identification of table inheritance objects either in conjunction with joins or separate from joins. A cursor may represent an instance of a table in a join statement or a table inheritance hierarchy. If all cursors are marked as unique row/object then that statement is eligible for caching. In this manner, both unique join caching rows and table inheritance objects are identified for caching.

In a related embodiment, a process comprises creating a queue of all cursors in a statement. Each cursor may represent a table in a join statement. For table inheritance, the root cursor for table inheritance is entered into the queue. A repetitive process then involves removing cursors from the head of the queue until all cursors are evaluated. A decision process involves whether there exists a unique index predicate for labeling, for example, as unique row or an object for labeling as a table inheritance object. Once the iterative process is complete, then, all cursors may be marked as unique row or object, and the cursors marked as unique row or object may be eligible for caching.

Further features and advantages of the present invention, as well as the structure and operation of various embodiments of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

Figure 5A:
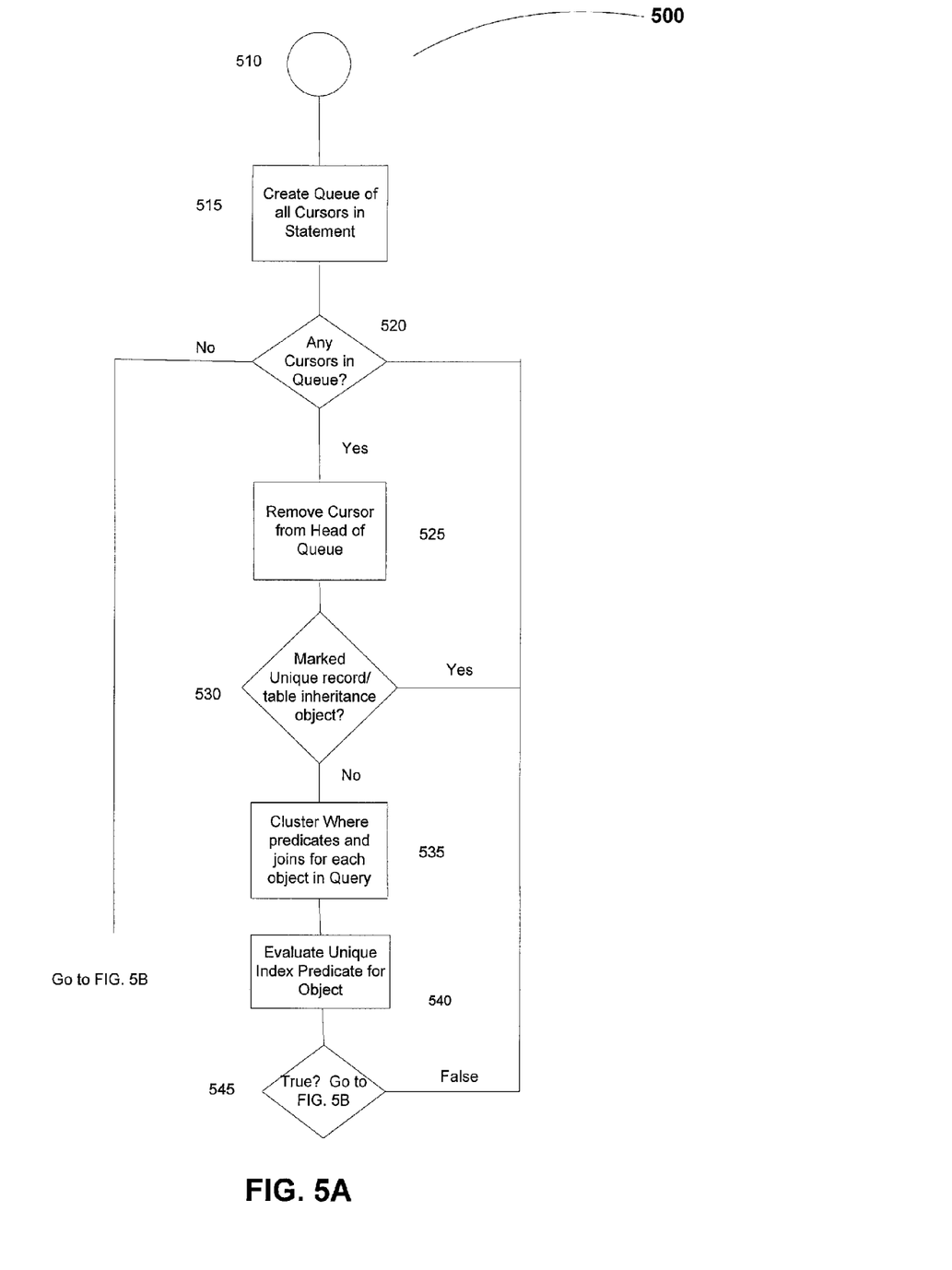
FIG. 5A and FIG. 5B together comprise an exemplary flowchart for unique join data and inheritance table object caching.
Figure 5B:
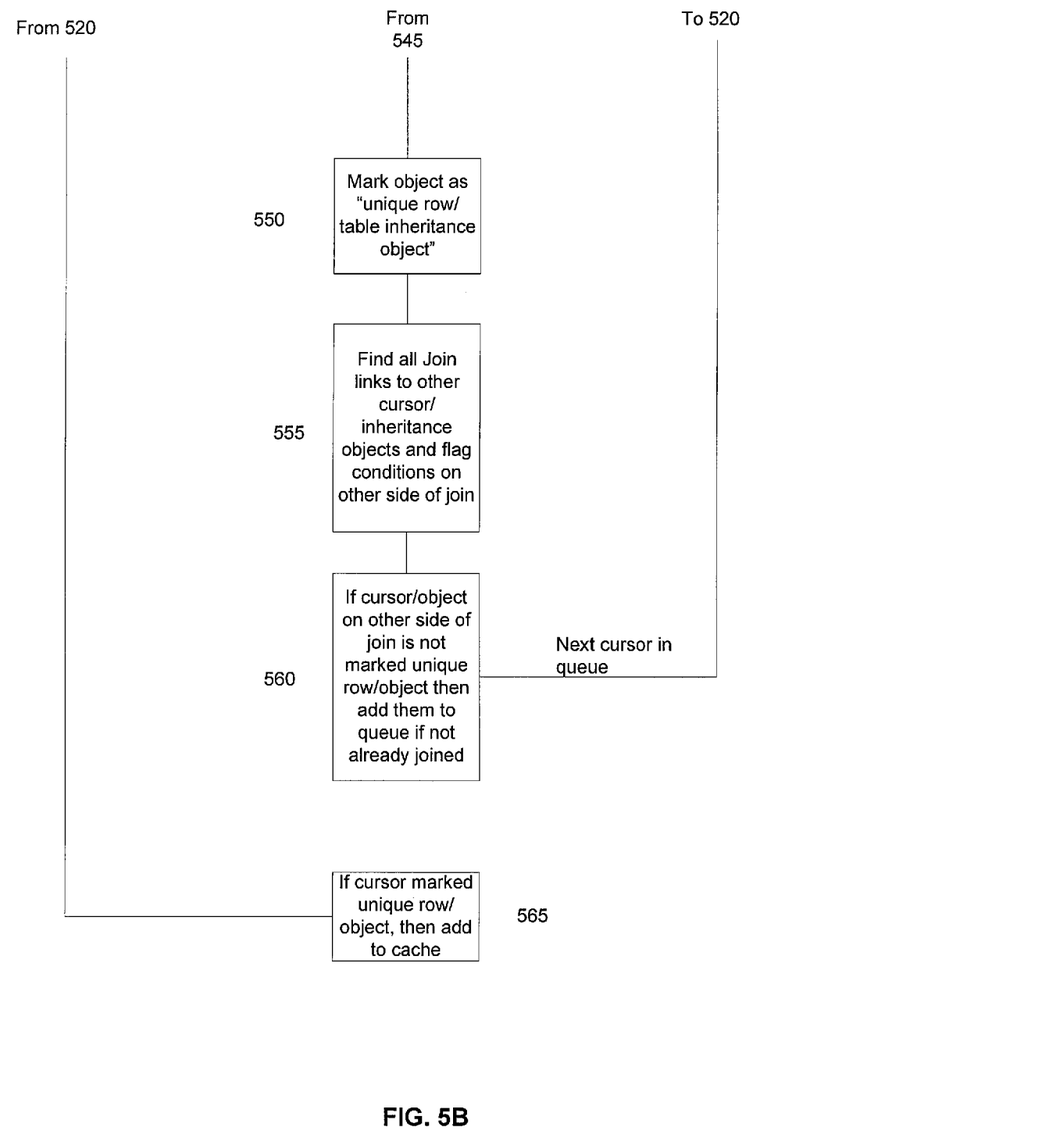

The present invention is directed to systems, methods and computer program products for facilitating unique join and inheritance table object caching in an enterprise resource planning (ERP) system. Firstly, we will provide an overview of unique join and inheritance table object caching. Then, hardware figures FIG. 1, FIG. 3 and FIG. 6 will be introduced. A discussion of an exemplary pseudo-code follows as depicted in FIGS. 5A and 5B.

Data caching of unique joins and inheritance table objects is supported by a process described briefly as follows. A unique join involves fetching one record from each table of a database according to a join condition given by a unique index as a key to the join. A table inheritance data caching is supported by treating an inheritance table hierarchy specially to identify objects for caching from the hierarchy. As an initial process, for a given query to be determined eligible for caching, there should exist at least one table having a predicate matching a unique index, for example, using the == operator. This process guarantees that there is at least one table with a record eligible for caching. Using this first table as a starting point, there may be a join condition indicating a join with another table or a table inheritance object. The process proceeds one cursor at a time, for example, by forming a queue of cursors and repeatedly marking unique row (join) or object (inheritance). At the conclusion of an iterative process for a given statement, all cursors may be marked unique row/object. The statement then may be eligible for caching.

A simple example may illustrate the process further. Given a table T1 with fields, field 1 and field 2 and a unique index on field field2, then, table T2 with field 1 and field2 and unique index on field field2, an exemplary statement may be given by: Select T1 join T2 where T1.field1==T2.field2 && T1.field2==2. The unique index predicate field2==2 may be used to look up table T1's cache. From T1's cache, the value of T1.field1, say, val_field11 may be used as a unique index predicate on table T2's cache. In other words, field2=='val_field1' may be used as a unique index predicate to look up the data record in table T2's cache. Obtaining the matching record for table T2 satisfies a join statement using record level caches without having to go to the database to fetch the result set. If there is a cache miss for a table, one may resort to proceeding to the database, (there being no cache). Data retrieval may be done at the time of join identification from an existing cache. For the case where the statement is not a unique join or it is a unique join but there is a cache miss, one may resort to the database look up. On the other hand, it is submitted that once unique join and inheritance caching are implemented, a substantial improvement in efficiency results because expensive network calls to an application object server or to a database server may be avoided.

Table inheritance data caching differs from table caching as table inheritance relates to objects. Consequently, all flushing, deleting, updating, inserting, removing oldest entries in caches and the like is performed at an object level instead of a single record level. A root of an inheritance table hierarchy may control caching for the whole inheritance table hierarchy. For inheritance caching, the record id and an object type discriminator together may make object retrieval more efficient. A join query may be broken down to do look ups in a regular table cache and inheritance table cache. The object look up may be done using unique key look up on any of the tables which are part of the object.

Join queries which have other extra filters apart from a unique index filter may also be eligible for cache. An exemplary filter, besides an equality filter may be a less than <, greater than >, less than or equal to or other operator known in the art. Such extra filters may be evaluated after the record is fetched from the cache for that table using the unique index filter. Logic for flushing of caches, updating records in caches, deletions of records and removal of records when a cache may be full may be at an individual table's cache level and so independent of other tables.

Referring now to FIG. 1, a block diagram illustrating an exemplary intranet enterprise resource planning (ERP) system 100 for an enterprise, according to an embodiment of the present invention, is shown.

Intranet enterprise queries and database system 100 includes a plurality of users 104 (shown as users 104a-d in FIG. 1) of an enterprise accessing, via a respective computing device 104 (also, shown as devices 104a-d in FIG. 1), an organization's intranet (i.e., private network) 106 via wired or wireless communication links 122, 124, 126 and 128. Computing device 104 may be described herein as an organizational or enterprise member client. As will be appreciated by those skilled in the relevant art(s) after reading the description herein, intranet 104 may be a private network deployed by an organization or enterprise such as a business enterprise for use by its employees. An enterprise system may, by way of example, be one for a university for use by its students and faculty, one for a government agency for its workers, and the like. As will also be appreciated by those skilled in the relevant art(s) after reading the description herein, system 100 may be deployed across one or more jurisdictions as, for example, a multinational business enterprise makes its intranet 106 available to its employees around the world. Such detail is not shown in FIG. 1.

In various embodiments, device 104 may be configured as a desktop 104a, a laptop 104b, a PDA 104c, a tablet or mobile computer 104d, an intelligent communications device or the like. Device 104, in order to access private network 106 may typically have to identify a user name and password, if not, enter further security information such as a secret key or fingerprint data to access network 106. In accordance with an embodiment of a method of dynamically querying an enterprise database, a user may access a database 118 by user name and password, the user name and password being utilized by any of servers 108, 110 and 112 to access an application object server 116 or application object server 116 may be obtained directly by a client for in turn structuring the query to database 118 as will be briefly described with reference to FIG. 6.

FIG. 1 also shows communications media 122 for a desktop computer, 124 for a laptop, 126 for an intelligent mobile device, and 128 for a tablet computer. Communications media may be of any known form, wireless or wired, fiber optic, coaxial cable, satellite and the like and utilized at any location in a network 100 including media 130, 132, 134, 136, 138, 140, 142 and 144 to connect clients to servers, servers to servers and the like.

As users 102 log into an organizational/enterprise intranet 106, they perform various computer-based tasks while logged into the organization/enterprise's intranet 106. All these data may be categorized into categories, for example: data and commands associated with setting up a process for inventory control or other activity involving updating data in tables joined by conditions or as objects in an inheritance table hierarchy. With reference to FIG. 1, an enterprise server herein referred to as an application object server 116 may comprise a Dynamics® AX server running software available from Microsoft Corporation of Redmond, Wash.

Referring now to FIG. 1, a client 104 may output queries, requests for database data retrievals, insertions, updates, deletions and the like of database 118 received as, for example, an X++ statement. X++ is a special programming language, similar to C#, used with Dynamics AX known as an object-oriented language. (Other programming languages may be used as well, for example, C++ and related languages, wherein X++ is described herein by way of example.)

In an alternate embodiment to FIG. 1, application object servers 116 may employ a web interface server 112 (e.g., the SHAREPOINT® web platform available from Microsoft Corporation of Redmond, Wash.), a host server 110 or a report server 108 to allow intranet administrators and clients to manage an enterprise database 118. For example, such a web platform 112 can be used as a base and can allow for complete configuration and monitoring of system 100 such as the location of log files, data filtering and the like.

In an alternate embodiment, an intranet administrator would have access to configuration, status and data retrieval servers 118 via a web service-based application programming interface (API) (e.g., Simple Object Access Protocol (SOAP) or RESTful). In such an embodiment, the intranet administrator may enforce privacy laws and business rules based on access credentials. For example, an unprivileged user might be allowed to retrieve some data being accessed within intranet 106, while an authorized user (a manager or director or owner of a work queue) may retrieve more detailed data and have additional authority for record management.

Figure 3:
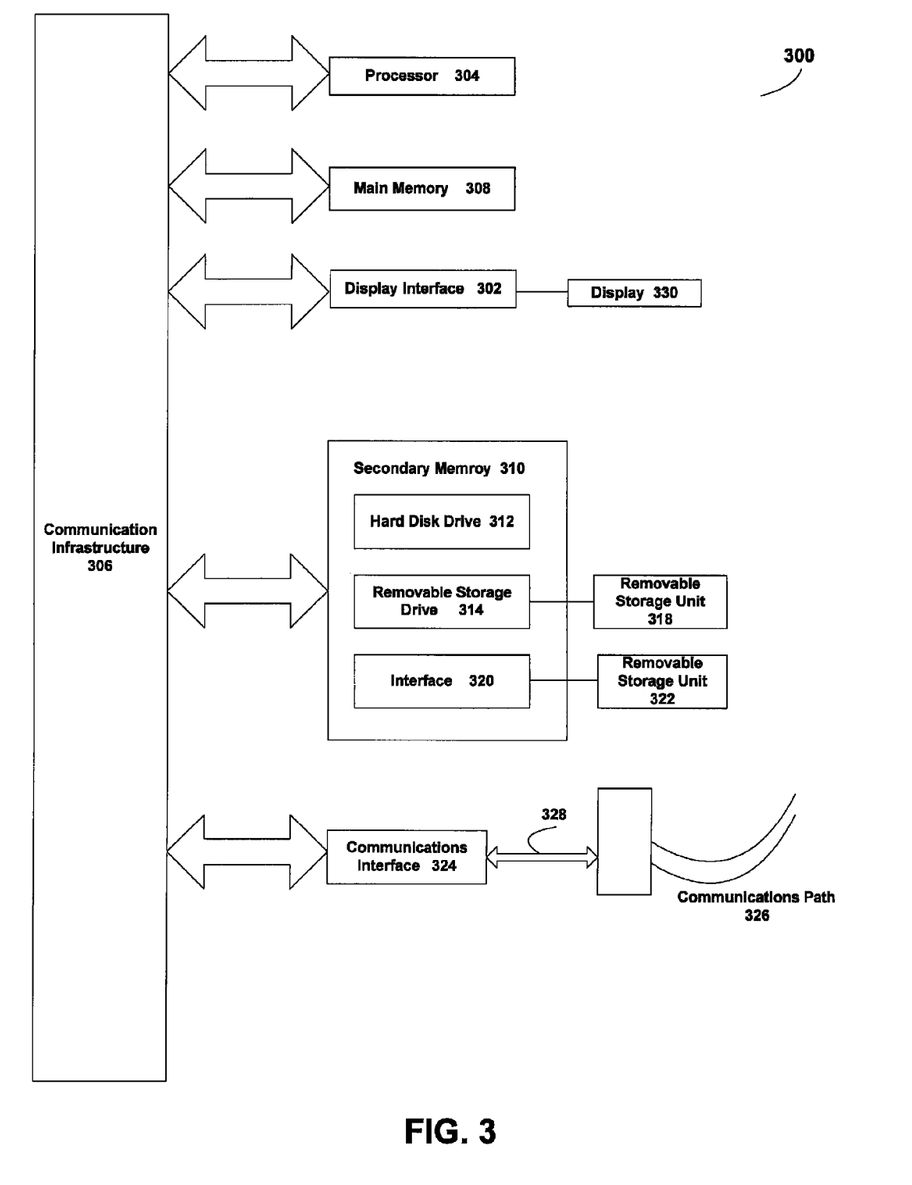
FIG. 3 is a block diagram of an exemplary computer system useful for implementing the present invention either as a client of FIG. 1 or server of FIG. 1 or FIG. 6 wherein data may be cached either at a client or a server.

An example of a computer system 300 is shown in FIG. 3 which may either represent any client or any server of FIG. 1.

Computer system 300 includes one or more processors, such as processor 304. The processor 304 may be connected to a communication infrastructure 306 (e.g., a communications bus or network). Various software aspects are described in terms of this exemplary computer system. After reading this description, it will become apparent to a person skilled in the relevant art(s) how to implement the invention using other computer systems and/or architectures. Computer system 300 may represent a client device 104 possessed by an organization/enterprise member. Computer system 300 may similarly represent a server 108, 110, 112, 114 or 116 or database 118 as introduced in FIG. 1 and components thereof.

Database server 118 may be an SQL or other database server responsible for maintaining for example documents, organization charts, inventory data and the like for an enterprise. As such, as a document is processed such as a purchase order, rules and parameters and conditions and the like may be retrieved by application object server 116 using a record caching system.

Computer system 300 can include a display interface 302 that forwards graphics, text and other data from the communication infrastructure 306 (or from a frame buffer not shown) for display on the display unit 330. A display interface may be what a user 102 sees on any one of devices 104. A user may type or click or use other form of data or command entry to input data/commands to a dynamic workflow system of the present invention.

Computer system 300 also includes a main memory 308, preferably random access memory (RAM) and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative aspects, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of non-transitory signals 328 that flow over communications media 122, 124, 130, 132, 140 and so on which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, an radio frequency (RF) link and other communications channels as explained above.

In this document, the terms "computer program medium" and "computer usable medium" are used to generally refer to media such as removable storage drive 314, a hard disk installed in hard disk drive 312 and signals 328. These computer program products provide software to computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

Figure 6:
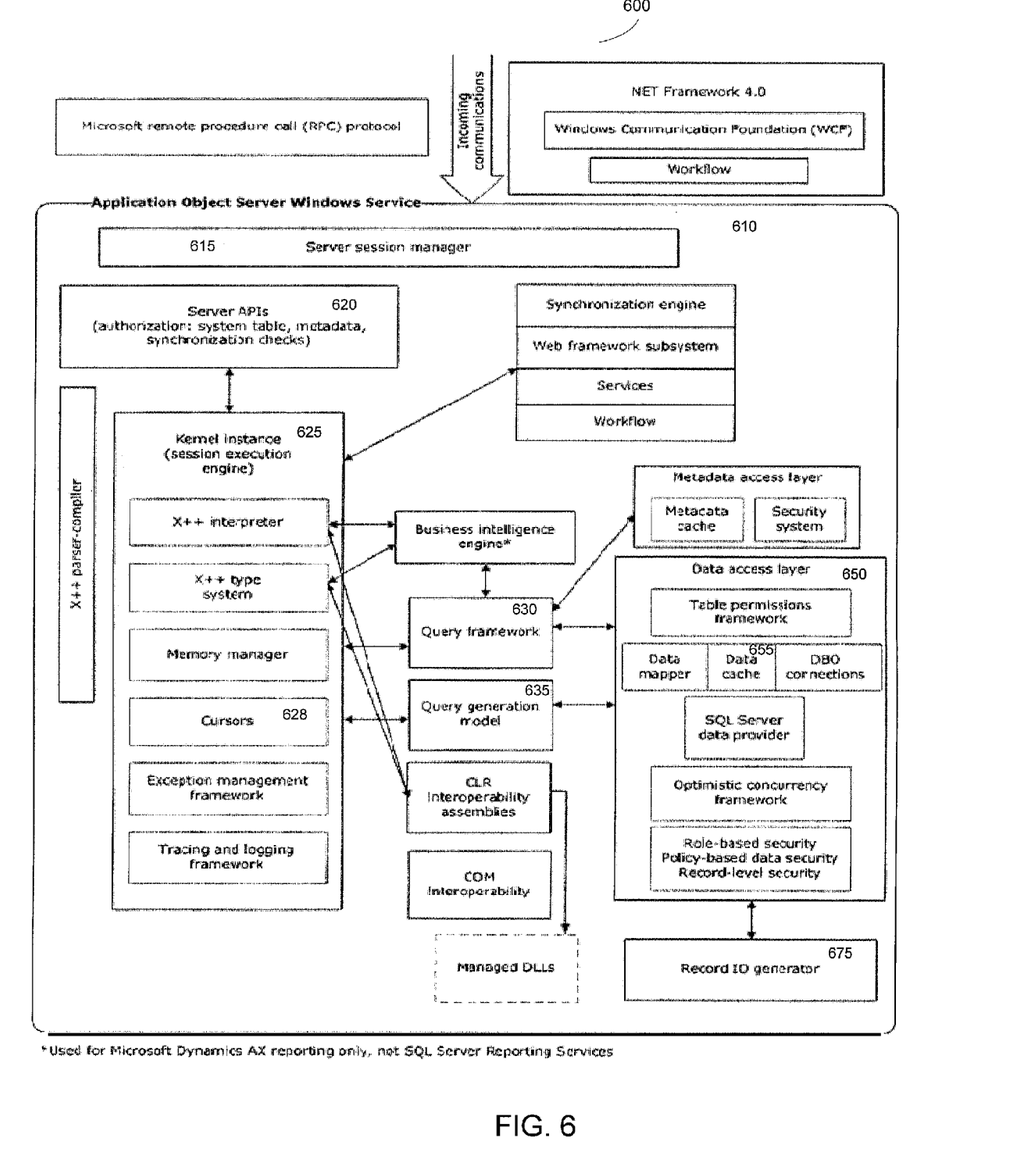
FIG. 6 is a further architecture diagram to that of FIG. 1 providing exemplary details of an application object server having a kernel instance, cursors, query generation, a data cache in a data access layer and a record identification generator for interaction with a database of FIG. 1 supporting unique data join and inheritance object caching.

Referring now to FIGS. 5A and 5B, there is shown an exemplary join/inheritance table object caching process for setting up a data cache of a data access layer 650 (FIG. 6). Occasional reference may be made to FIG. 6, a system block diagram of an application object server 116, 600. Process 500 of FIGS. 5A and 5B, shows start 510 representing the start of caching processes for unique join data and inheritance table object caching. Referring to FIG. 1, it will be assumed that a client has initiated a query for, update or otherwise initiated an attempt to access data of a database 118. In so doing, the client request is received at application object server 600 and an associated statement is processed at kernel instance 625.

First referring to process 515, there is shown a process of creating a queue of all cursors from a given statement. Referring to FIG. 6, cursors comprise an element of the kernel instance 625 and may be coupled to a query generation model 635 of a business intelligence engine. Each cursor may represent an instance of the table in a join statement. A cursor may be central to a data access engine 650 and may represent a data reader (to support iteration), a single record in a table (instance of an entity) or a table inheritance hierarchy. Query framework is coupled to kernel instance 625 as well, and these provide two way communications with data access layer 650. Within data access layer 650 may be a data cache memory where data may be cached depending on the result of process 500. It is important to note that data may also be cached in data cache memory on clients such as clients 104a, 104b. If there is a cache hit on a client 104, then the data request may not be sent to the application object server 116 at all.

Referring further to FIG. 5A, a process 520 is further exemplified by depicted decision as to whether there are further cursors in a queue of the process 500. Here, if there are no further cursors to process from the queue (the answer is No), the process moves all the way to FIG. 5B last process 565 where, if each of the cursors is marked as unique row (join) or object (table inheritance), the statement is an eligible candidate for cache. If there are further cursors in the queue, (Yes), process 500 proceeds to process 525.

Referring further to FIG. 5A, caching next involves process 525 which is removal of cursor from the head of a queue. As is well known in the art, queues may be first in first out, last in first out. The present embodiment assumes a cursor queue may be established in any known manner. Thus, while one may infer first in first out from process 525, other queue arrangements may be implemented.

Referring again to FIG. 5A, process 530 is to examine the cursor removed from the head of the queue for being one of a unique record or a unique object of an inheritance table hierarchy. If there is an indication of one of unique record or inheritance table object then, the process moves back to process 520. If not, then, control flows to process 535. Process 535 is associated with clustering, i.e. cluster where predicates (of a where expression) and join conditions associated with the given cursor/table inheritance object in the given query statement. Clustering process 535 leads to process 540 of evaluating if there is a unique index predicate or unique index for this cursor/table inheritance object. In the case of table inheritance, the unique index predicate may be on any table part of the inheritance table hierarchy.

Following FIG. 5A, further, process 545 then follows for determining whether the result of process 540 is true or not. If true, then this cursor may be marked as one of unique row or table inheritance object, process 550 of FIG. 5B. If False, control returns to process 520 to determine if there are more cursors for the statement in the queue.

Now referring to FIG. 5B, which is a continuation of the process 500 of FIG. 5A, process flow control moves from marking a unique row/table inheritance object 550 to process 555. Process 555 comprises finding all join links from the marked cursor/table inheritance object (by inheritance table hierarchy) to other cursor/table inheritance objects. Join conditions are flagged as where predicate for the cursor/object on the other side of the join. Process 555 then turns over control to process 560.

Referring further to 560, there is an arrow returning to FIG. 5A process 520. If the cursor/object on the other side of the join is not marked as one of unique row or object, these are added to the queue if they have not already been added to the queue and so require further processing according to FIG. 5A process 520. When control is passed to process 565, at that process, every cursor in the queue should have been evaluated for one of unique row or object marking, and the results of processing the statement may be eligible for storage in a data cache (caching).

Referring now to FIG. 6, there is shown a system architecture for an application object server 116 (FIG. 1) which supports data caching. Incoming communications are received from clients and other servers per FIGS. 1 and 3 which may comprise database related communications. There are shown the following elements of application object server 610 (FIG. 1, server 116): a server session manager 615 which may provide overall session management, server API's for various functions and features identified 620, and a kernel instance 625 and, within kernel instance 625, there is cursors 628. The kernel instance may be coupled to a data access layer 650 or engine via a query framework 630 and a query generation model 635. Within the data access layer 650 may be a data cache 655 and a record ID generator 675.

As will be apparent to one skilled in the relevant art(s) after reading the description herein, the computer architectures shown in FIGS. 1, 3 and 6 may be configured as a desktop, a laptop, a server, a tablet computer, a PDA, a mobile computer, an intelligent communications device or the like. The $X_{++}$ programming language is one of many programming languages that may be used known in the art of enterprise resource planning systems, for example, C# is one alternative. Any of these architectures may be under the personal control of a user client 104 and may be operated transparent to other database processes, for example, for data entry/retrieval of inventory data, purchase order data, request for proposal data, marketing and sales data and related organizational hierarchy data as well as other data relevant to the caching of data to improve overall system efficiency according to join conditions and inheritance table hierarchies as described above.

In yet another embodiment, the invention is implemented using a combination of both hardware and software and communications media may be wireless, wired or other form of communication recognizing any need for security of data of the enterprise.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures. For example, the systems, methods and computer program products for facilitating the querying of data of a database in an intranet environment may be also applicable to other networks such as internets.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A computer-implemented method configured to provide caching of data retrieved from joined tables and an inheritance table hierarchy of a database in an enterprise, the computer-implemented method comprising:

creating a queue of cursors based on a join statement associated with a database having a plurality of tables and/or table inheritance hierarchies, each one of the cursors representing a record in one of the tables or one table inheritance object according to one of the table inheritance hierarchies;

evaluating one of the cursors of the queue to determine if the one of the cursors is one of a unique record in one of the tables or a unique table inheritance object according to the one of the table inheritance hierarchies;

in response to evaluating that the one of the cursors of the queue is not one of the unique record or the unique table inheritance object, clustering where predicates and/or join conditions associated with the one of the cursors; and determining if the clustered where predicates and/or join conditions correspond to a unique index;

in response to determining that the clustered where predicates and/or join conditions correspond to the unique index, marking the join statement as a unique join according to which one record or table object is fetchable from at least one of the tables; and in response to marking the join statement as the unique join, storing data of the one record or table object fetchable from the at least one of the tables in a data cache configured for retrieval from the data cache.

2. The computer-implemented method of claim 1, further comprising:
repeating evaluating cursors of the queue until the cursors of the queue have been evaluated and marked.

3. The computer-implemented method of claim 1, further comprising:
in response to evaluating that the one of the cursors of the queue is one of the unique record or the unique table inheritance object, evaluating another one of the cursors of the queue and determining if the another one of the cursors is one of a unique record in one of the tables or a unique table inheritance object according to the one of the table inheritance hierarchies.

4. The computer-implemented method of claim 1, further comprising:
finding a join link to another one of a cursor or a table inheritance object responsive to evaluating the one of the cursors.

5. The computer-implemented method of claim 1, wherein the data cache comprises a data cache of a data access layer of an application object server.

6. The computer-implemented method of claim 1, wherein a unique record mark relates to a row of data of a table or an object.

7. The computer-implemented method of claim 1, wherein a unique record mark relates to a plurality of columns of data.

8. The computer-implemented method of claim 1, further comprising:
in the event that a queue cursor remains unmarked, performing a database look up for the statement.

9. The computer-implemented method of claim 1, wherein said queue comprises a first-in first out queue configuration of cursors in the queue.

10. The computer-implemented method of claim 1 for implementation on an application object server, the application object server receiving incoming communications associated with an enterprise database and comprising a kernel instance, a query generation model and a data access layer.

11. A computer system, comprising:
a processor; and
a memory containing instructions that when executed by the processor, causing the processor to perform a process comprising:
creating a queue of cursors based on a join statement associated with a database having a plurality of tables and/or table inheritance hierarchies, each one of the cursors representing a record in one of the tables or a table inheritance object according to one of the table inheritance hierarchies;
evaluating one of the cursors of the queue to determine if the one of the cursors is one of a unique record in one of the tables or a unique table inheritance object according to the one of the table inheritance hierarchies;
in response to evaluating that the one of the cursors of the queue is not one of the unique record or the unique table inheritance object,
clustering where predicates and/or join conditions associated with the one of the cursors; and
determining if the clustered where predicates and/or join conditions correspond to a unique index;
in response to determining that the clustered where predicates and/or join conditions correspond to the unique index, marking the join statement as a unique join according to which one record or table object is fetchable from at least one of the tables; and
in response to marking the join statement as the unique join, storing data of the one record or table object fetchable from the at least one of the tables in a data cache configured for retrieval from the data cache.

12. The computer system of claim 11, wherein the process further comprising:
finding a join link to another one of record and object responsive to evaluating the cursor.

13. The computer system of claim 11, wherein the computer system having control logic comprises an application object server, the application object server receiving incoming communications associated with an enterprise database and comprising a kernel instance, a query generation model and a data access layer.

14. The computer system of claim 11 wherein the process performed by the processor further includes:
repeating evaluating cursors of the queue until the cursors of the queue have been evaluated and marked.

15. The computer system of claim 11 wherein the process performed by the processor further includes:
in response to evaluating that the one of the cursors of the queue is one of the unique record or the unique table inheritance object, evaluating another one of the cursors of the queue and determining if the another one of the cursors is one of a unique record in one of the tables or a unique table inheritance object according to the one of the table inheritance hierarchies.

16. The computer system of claim 11, wherein a unique record mark relates to a row of data of a table, an object, or a plurality of columns of data.

17. A computer-readable memory containing instructions that when executed by a processor, the processor performs a process comprising:
creating a queue of cursors based on a join statement associated with a database having a plurality of tables and/or table inheritance hierarchies, each one of the cursors representing a record in one of the tables or one table inheritance object according to one of the table inheritance hierarchies;
evaluating one of the cursors of the queue to determine if the one of the cursors is one of a unique record in one of the tables or a unique table inheritance object according to the one of the table inheritance hierarchies;
in response to evaluating that the one of the cursors of the queue is not one of the unique record or the unique table inheritance object,
clustering where predicates and/or join conditions associated with the one of the cursors; and
determining if the clustered where predicates and/or join conditions correspond to a unique index;
in response to determining that the clustered where predicates and/or join conditions correspond to the unique index, marking the join statement as a unique join according to which one record or table object is fetchable from at least one of the tables ; and
in response to marking the join statement as the unique join, storing data of the one record or table object fetchable from the at least one of the tables in a data cache configured for retrieval from the data cache.

18. The computer-readable memory of claim 17 wherein the process performed by the processor further includes:
repeating evaluating cursors of the queue until the cursors of the queue have been evaluated and marked.

19. The computer-readable memory of claim 17 wherein the process performed by the processor further includes:
in response to evaluating that the one of the cursors of the queue is one of the unique record or the unique table inheritance object, evaluating another one of the cursors of the queue and determining if the another one of the cursors is one of a unique record in one of the tables or a unique table inheritance object according to the one of the table inheritance hierarchies.

20. The computer-readable memory of claim 17, wherein a unique record mark relates to a row of data of a table, an object, or a plurality of columns of data.

\* \* \* \* \*